United States Patent [19]

Rossigno et al.

[11] 3,771,838
[45] Nov. 13, 1973

[54] SYNCHRONIZED BRAKING SYSTEM FOR A TOW VEHICLE TRAILER

[75] Inventors: Louis P. Rossigno; Michael E. Gatt, both of South Bend, Ind.

[73] Assignee: The Bendix Corporation, South Bend, Ind.

[22] Filed: June 29, 1972

[21] Appl. No.: 267,294

[52] U.S. Cl. .................... 303/7, 60/54.6 E, 91/32, 303/20
[51] Int. Cl. ............................................ B60t 13/74
[58] Field of Search .................... 60/54.6 E; 91/32; 188/3 R; 303/7, 20

[56] References Cited
UNITED STATES PATENTS

| | | | |
|---|---|---|---|
| 3,232,674 | 1/1966 | Stelzer | 303/7 |
| 3,357,311 | 12/1967 | Cripe | 91/32 |
| 3,364,818 | 1/1968 | Hager et al. | 91/32 X |
| 3,371,484 | 3/1968 | Julow | 60/54.6 E X |
| 3,507,542 | 4/1970 | Cannella | 303/7 |
| 3,574,414 | 4/1971 | Jacob | 303/7 |

Primary Examiner—Milton Buchler
Assistant Examiner—Stephen G. Kunin
Attorney—Leo H. McCormick et al.

[57] ABSTRACT

A control valve for use in a tow vehicle-trailer system to synchronize the activation of the trailer brakes with the brakes of the tow vehicle. The control valve transfers an operational signal to a servometer which pressurizes a first fluid to activate the trailer brakes in response to a second pressurized fluid which activates the brakes of the tow vehicle. A piston within the control valve has a first face joined to a smaller diameter second face by a stem with an axial opening. The second pressurized fluid acts on the first and second faces to move the axial opening against a seat when the pressure of the second pressurized fluid reaches an initial predetermined value. An increase in the pressure of the second pressurized fluid will act on the second face and move the piston away from the seat to allow the increase to modify the operational signal to the servometer.

9 Claims, 2 Drawing Figures

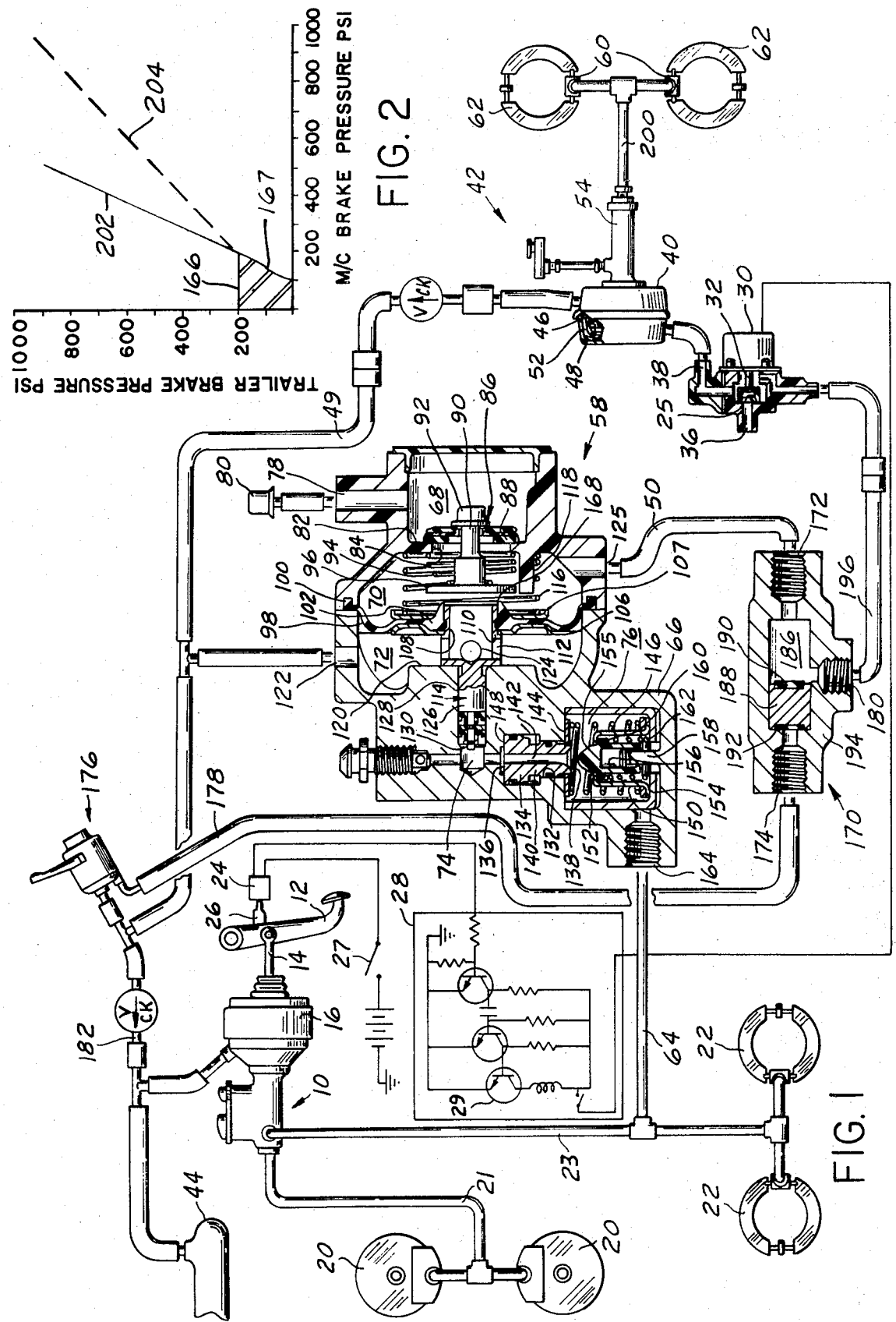

SYNCHRONIZED BRAKING SYSTEM FOR A TOW VEHICLE TRAILER

BACKGROUND OF THE INVENTION

An ever increasing number of people are purchasing house trailers, recreational trailers and small cargo trailers which are moved by a tow vehicle and traveling to various parts of the country over roads varying from interstate highways to trails in the wilderness. For most of these people driving the tow vehicle pulling a trailer will be an initial experience. Various types of braking system such as pneumatic, electric and surge brakes have been proposed and used on trailers. For an example of a surge brake system, see U.S. Application Ser. No. 228,936, assigned to the same assignee as this application and incorporated here by reference. In the pneumatic and electric braking system, brake actuation of the trailer is usually done by the operator separately and independently of the tow vehicle. Unless the operator has extra ordinary reflexes, the actuation of the brakes of the tow vehicle and trailer will not be coordinated. If the coefficient of friction of the road is low, as when wet, snow packed or icy, when the actuation of the brakes are not synchronized, a possible jackknife, sway or skid can result.

SUMMARY OF THE INVENTION

We have devised a tow vehicle-trailer braking system wherein the actuation of the individual brakes are synchronized. An actuation means in the tow vehicle responsive to an operator relays an input force to a power braking device for developing a pressure in a hydraulic fluid capable of activating the brakes of the tow vehicle. Upon initial movement of the actuation means, an electronically timed electrical signal will simultaneously operate a valve to momentarily allow air at atmospheric pressure to create a pressure differential across a wall of a servomotor connected to the trailer brakes. A synchronizer valve means receives the same hydraulic fluid under pressure that is transmitted to the tow vehicle. This hydraulic fluid under pressure in the synchronizer valve acts on and moves a first piston means to permit air at atmospheric pressure to freely flow the servomotor and increase the pressure differential therein. A second piston means in the synchronizer valve means has a first face and a smaller second face connected by a stem with an axial passage through which the hydraulic fluid under pressure from the tow vehicle flows into a control chamber. When the pressure of the hydraulic fluid reaches an intensity where a pressure differential acting across first and second faces overcomes a resilient means, the second piston means will move and expand the control chamber. With the control chamber expanded the hydraulic fluid under pressure acting on the first piston means is reduced and the operational force acting to allow air at atmospheric to flow to the servomotor proportionally reduced. With an increase in the hydraulic fluid pressure, an unbalance will again occur across the second piston means to allow flow of the increased hydraulic fluid under pressure into the control chamber and accordingly change the position of the first valve means. With a change in the first valve means, the actuation of the servomotor will be modified to reflect the pressure change in the hydraulic fluid.

It is therefore the object of this invention to provide a tow vehicle-trailer system with valve means to synchronize the actuation of the brakes of the trailer with the brakes of the tow vehicle.

It is another object of this invention to provide a tow vehicle-trailer system with a synchronizer valve having means for proportionally modifying a hydraulic actuation signal to correspondingly supply an operational signal to a servomotor in the trailer.

These and other objects will become apparent from reading this specification and viewing the drawing.

BRIEF DESCRIPTION OF THE DRAWING

FIG. 1 is a schematic representation of a tow vehicle-trailer braking system with a sectional view of the means for synchronizing the actuation of the brakes in the trailer with the tow vehicle.

FIG. 2 is a graph comparing the operational fluid line pressures in the tow vehicle with the trailer.

DETAILED DESCRIPTION OF THE PREFERRED EMBODIMENT

In the embodiment shown in FIG. 1, the braking system 10 of a tow vehicle is actuated by an operator applying an input force on brake pedal 12. The input force moves a valve control rod 14 which actuates the servomotor 16 for moving a piston (not shown) in a master cylinder 18 for supplying the front brakes 20 through conduit 21 and the rear brakes 22 through condit 23 with pressurized hydraulic fluid.

The brake pedal 12 is connected to a brake light switch 24 by movable plunger 26. Upon movement of the plunger 26, the electrical circuit switch 24 is closed causing a signal to be relayed to electronic timer means 28. The electronic timer means 28 will transmit electrical energy through transistor unit 29 to energize a solenoid valve means 30, similar to that described in U. S. Pats. Nos. 3,371,484 and 3,357,311 incorporated herein by reference. The solenoid 30 will be energized for a length of time corresponding to the time required for the air at atmospheric pressure in conduit 50 to be transmitted to the servomotor 40. With solenoid 30 activated, plunger 32 is moved away from seat 24 allowing air at atmospheric presure to flow through opening 36 into conduit 38 connected to the servomotor 40 in the trailer braking system 42. The servomotor 40 is normally vacuum suspended by the vacuum developed at the manifold 44 which evacuates the front chamber 46 through conduit 49 and the rear chamber 48 through conduit 50. When the solenoid 30 is activated, the air at atmospheric pressure will be communicated to the rear chamber 48 and a pressure differential will be created across a diaphragm means 52. The pressure differential will cause the diaphragm means 52 to move to exert a force on a pressurizing piston (not shown) in cylinder 54 which supplies a hydraulic force sufficient for the wheel cylinders 60 in the trailer brakes to move the brake linings 62 against the brake drums (not shown).

Simultaneously with the electrically operated solenoid valve means 3o being activated, the hydraulic fluid under pressure supplied to the rear wheel 22 on the tow vehicle is transmitted by conduit 64 to the synchronizer valve means 58.

the synchronizer valve means 58 has a housing 66 with a first chamber 68, a second chamber 70, a third chamber 72, a fourth chamber 74 and a fifth chamber 76 which are interconnected to each other. The first chamber 68 has an inlet port 78 which is connected to the atmosphere through filter 80. A wall 82 with an axial opening 84 separates the first chamber 68 from the second chamber 70. The axial opening 84 is closed by a poppet valve means 86. The poppet valve means 86 has a head 88 of resilient material retained on a stem 90 by a cap 92. A spring 94 acts on plate 96 fixed to the stem 90 urging the resilient head 88 against the wall 82 to separate the first chamber 68 from the second chamber 70.

The second chamber 70 is separted from the third chamber by a diaphragm 98 which has a bead 100 along its external periphery secured to the housing 66. A lip 102 on the internal periphery of the diaphragm is snapped into a groove 108 on the external periphery 110 of the tubular head 112 of a first piston means 114. The diaphragm 98 adjacent the internal opening is sandwiched between a pair of plates 106 and 107. Plate 107 is secured to the tubular head 112 by snapping into groove 108 adjacent lip 102. A spring 116 which surrounds a guide 118 in the second chamber 70 acts on plate 107 to hold tubular head 112 against wall 120. The third chamber 72 has an inlet port 122 which is connected to the intake manifold 44 through conduit means 49 to evacuate the air from chamber 72. A passage 124 through the tubular head will communicate vacuum in chamber 72 into chamber 70. The vacuum communicated to chamber 70 will normally evacuate air from the rear chamber 48 through outlet 124 connected to conduit means 50.

The first piston means 114 has a stem 126 attached to the tubular head 112 which is located in bore 128 in the housing between the third chamber 72 and fourth chambers 74. The rear face 130 of stem 128 has a smaller diameter than that of the tubular head 112 and extends into the fourth chamber 74.

A second piston means 134 is located in a passage 132 which connects the fourth chamber 74 with the fifth chamber 76. The second piston means 134 has a first face 136 connected to a smaller second face 138 by a stem 140. The stem 140 has an axial opening 142 therethrough to provide a passageway from the fifth chamber 76 to the fourth chamber 74. A disc 144 is attached to the stem 140 adjacent face 138 and a force from resilient means 146 which urges the first face 136 against a shoulder 148 in the fourth chamber. A sleeve 150 has an annular inwardly projecting shoulder 152 on one end and an outwardly projecting flange 154 on the other end. A resilient stop 155 located in the sleeve 150 has a bore 156 which is concentric to guide 158 extending from the housing into the fifth chamber 76 in an axial alignment with opening 142 in the second piston means. The resilient stop has a rib 160 which is biased against shoulder 152 by spring 162 which concentrically surrounds guide 158. The fifth chamber 76 has an inlet 164 which is connected to conduit 64 to receive the same pressurized hydraulic fluid that is communicated to the rear brakes 22.

During the time that the electronic timer 28 has supplied the solenoid valve 30 with electrical energy, the trailer brake line pressure will be between lines 166 and 167 depending upon pedal 12 application rate. Simultaneously, the hydraulic pressure of the fluid in conduit 23 of the tow vehicle will be transmitted through the conduit 64 into the fifth chamber 76 and to the fourth chamber 74 through the axial opening 142. This hydraulic fluid pressure will act on face 130 of the first piston means 114 and face 136 of the second piston means 134. The hydraulic pressure acting on face 130 will move the face 168 against plate 96 interrupting vacuum communication to the second chamber 70. Further movement by the first piston means 114 will move face 88 of the poppet valve means 86 away from the wall 82 allowing air at atmospheric pressure to freely flow into the second chamber 70. The air at atmospheric pressure flows into conduit 50 to a priority valve means 170.

The priority valve means 170 has a control chamber 186 with a first port 172 connected to conduit 50, a second port 174 connected to a hand control valve means 176 through conduit 178, and a third port 180 connected to conduit 38 going to the servomotor 40. The hand control valve means 176 is connected to conduit 182 going to the manifold 44. The control chamber 186 has a shuttle piston 188 therein with rubber gaskets 190 and 192 on the ends thereof. With air at atmospheric pressure communicated from the second chamber 70 through conduit 50 to the first port 172 and vacuum available at the second port 174, a pressure differential will move the shuttle piston 188 toward the vacuum port. The pressure differential will bias the rubber gasket 192 against the housing 194 to seal the second port 174 from the control chamber 186. In this position, air at atmospheric pressure flows out from the control chamber 186 through the third port 180 into conduit 196 which is connected to conduit 38 through the solenoid valve means 30. By the time the solenoid valve means 30 is deactivated, this air at atmospheric pressure in conduit 196 will have reached the rear chamber 48 of the servomotor 42 to continue pressurizing the hydraulic fluid in conduit 200 supplying the wheel cylinders 60 of the trailer brakes with an actuation force. The actuation pressure of the hydraulic fluid in conduit 200 as compared to that of the hydraulic fluid in conduit 23 during further input from the operator through pedal 12 after the air at atmospheric pressure in conduit 196 reaches the rear chamber 48 would normally follow a line 202. However, the second piston means 134 in the synchronizer valve means 58 proportions the effect of the hydraulic force acting on the first piston means 114 in the following manner to effectively modify the output from the servomotor 42 corresponding to a line 204 illustrative of the operational tow vehicle brake liner pressure. The hydraulic fluid in chamber 74 will act on face 136 and the hydraulic fluid in chamber 76 will act on face 138 of the second piston means. Since face 136 is larger than face 138, a pressure differential force will develop to move the second piston means 134 toward poppet 155 by overcoming resilient means 146. As the second piston means 134 moves toward the poppet 155, the fourth chamber 74 will be proportionally expanded. The resulting relationship between the pressure of the hydraulic fluid in chamber 74 to that of the pressure of the hydraulic fluid in chamber 76 will be proportionally reduced as a direct function of the surface area of the first face 136 as compared to that of the surface area of the second face 138. Once face 138 has seated the resilient poppet 155, an increase in the pressure In the fifth chamber 76 which acts on face 138 is necessary to move the second piston away from the poppet 155 to allow for a proportionate amount of the increase into the fourth chamber 74. With a decrease in the hydraulic fluid pressure in chamber 76, the hydraulic fluid pressure acting on poppet 155 will overcome spring 146 allowing the fluid to flow out through the axial opening past face 138. Thus, any change in the actuation input to pedal 12 and subsequent development of hydraluic fluid pressure for operating the rear brakes 22 will be synchronized with the actuation of the trailer brakes taking into account any change in the center of gravity of the unit during deceleration.

Upon removal of the input force on pedal 12, the pressurizing force on the hydraulic fluid in conduit 23 is terminated. The hydraulic fluid in chamber 74 will be released by resilient means 146 urging the second piston means 134 away from poppet 155. With the hydraulic pressure off the first piston means 114, spring 116 acting on plate 107 urges the tubular face away from face 96 allowing head 88 to be seated on wall 82. Vacuum in the third chamber can now evacuate the air present in the second chamber 70 and the rear chamber 48 of the servomotor and eliminate the pressure differential across wall 52 to terminate the pressurizing force of the hydraulic fluid in conduit 200.

While pulling a trailer over a highway as when encountering a moving vehicle, a vacuum can occur between the vehicle which can cause a swaying in the trailer. The operator to offset or counter this swaying will want to apply the brakes of the trailer alone. To apply the trailer brakes, the hand control valve is moved allowing air at atmospheric pressure to flow in conduit 178 to the priority valve means 170. A pressure differential between the second port 174 and the first port 172 connected to vacuum in the second chamber 70 will move the shuttle 188 toward the first port 172 and hold the gasket 190 against the housing 194 to seal the first port 172. This air at atmospheric pressure will flow through the control chamber 186 out the third port into conduit 196 past the solenoid valve means 30 and into rear chamber 48 through the supply conduit 38. With air at atmospheric pressure in the rear chamber 48 and vacuum in chamber 46, a pressure differential will be created which will move wall means 52. This pressure differential will correspondingly pressurize the hydraulic fluid in cylinder 54 which actuates the wheel cylinder 60. With the wheel cylinder 60 actuated, brake shoes 62 engage the brake drums (not shown) to appropriately reduce the velocity of the trailer causing the tow vehicle-trailer to straighten out and thereby eliminate any swaying action. Upon releasing the hand control valve means 176, vacuum from the manifold will directly evacuate air from the rear chamber 48 through internal combination of conduit 206 with conduit 178.

We claim:

1. In a tow vehicle-trailer braking system, means for transferring a control signal to operate a differential pressure servomotor which supplies a first pressurized fluid to activate the brakes of the trailer in synchronization with a second pressurized fluid which activates the brakes of the tow vehicle and for modifying said control signal as the pressure of said second pressurized fluid changes, said means comprising:

a housing having a first chamber, a second chamber, a third chamber, a fourth chamber and a fifth chamber interconnected to each other, said first chamber being connected to atmospheric pressure, said second chamber being connected to said servomotor, said third chamber being connected to a source of vacuum, said fifth chamber being connected by a conduit to receive said second pressurized fluid going to the brakes of the tow vehicle;

poppet valve means resiliently held against a wall for closing an opening between the first and the second chambers;

movable wall means having an external periphery secured to said housing for separating said second and third chambers, said movable wall means having an internal peripheral lip surrounding a central opening;

first piston means sealingly retained in a first bore in said housing between the third and fourth chambers, said first piston means having a head located in said third chamber with an external groove on the periphery thereof into which the peripheral lip of the wall means is secured, said head having a passageway for communicating vacuum from the third chamber to the second chamber;

second piston means sealingly retained in a second bore in said housing between the fourth and fifth chambers, said second piston means having a first face located in said fourth chamber and a smaller second face located in said fifth chamber, said first face being connected to said second face by a stem with an axial passage;

poppet means located in said fifth chamber for limiting the movement of said second piston means;

spring means located in said fifth chamber for biasing said second piston means toward the fourth chamber; and actuation means responsive to an operator for developing said second pressurized fluid, said second pressurized fluid being communicated to said fifth chamber and passing through the axial passage in the stem of the second piston means into said fourth chamber, said pressurized second fluid in the fourth chamber acting on the first piston means to move said head against the poppet valve means simultaneously interrupting vacuum communication through said passageway and opening atmospheric pressure communication from the first chamber into the second chamber, said atmospheric pressure in the second chamber being transferred through a supply conduit to said servomotor for creating a pressure differential across a vacuum suspended diaphragm which correspondingly moves a pressurizing means to develop said first pressurized fluid for activating said trailer brakes, said second pressurized fluid in the fourth chamber acting on the first face to move said second face into engagement with said poppet means to prevent flow through the axial passage in said stem, said second piston means upon moving will expand the volume in the fourth chamber and thereby correspondingly modify the force of the second pressurized fluid acting on the first piston.

2. In the two vehicle-trailer system, recited in claim 1 wherein said actuation means increases the value of said second pressurized fluid communicated to the fifth chamber, said increased value of the second pressurized fluid acting on the second face and in conjunction with the spring means moving said second piston means away from the poppet means to proportionately allow the increased second presurized fluid to flow through the axial passage in the stem until the force acting on the first face is sufficient to again overcome the spring means and again seat the second face on said poppet means.

3. In the two vehicle-trailer system, recited in claim 2 wherein said actuation means further includes:
electrically controlled valve means connected to said control conduit responsive to the actuation means for initially supplying atmospheric pressure to create the pressure differential across said vacuum suspended diaphragm during the development of said second pressurized fluid.

4. In the tow vehicle-trailer system, recited in claim 3 wherein said electrically controlled valve means includes:
timer means connected to said actuation means for establishing the actuation period for said electrically controlled valve means.

5. In the tow vehicle-trailer system, recited in claim 4 wherein said actuation means further includes:
manual foot control means activated by an operator for simultaneously imparting an operational signal to a pressurizing means which develops the second pressurized fluid and to said time means which activates said electrically controlled valve means.

6. In the two vehicle-trailer system, recited in claim 5, wherein said actuation means further includes:
hand control means connected to said supply conduit for actuating said servomotor when the intensity of said second pressurized fluid in the fourth chamber is insufficient to move the first piston means.

7. In the tow vehicle-trailer system, as recited in claim 6 wherein said actuation means further includes:
transfer valve means located in said supply conduit having shuttle means responsive to a pressure differential between a first inlet connected to said second chamber and a second inlet connected to said control means for selectively allowing atmospheric pressure to communicate through an outlet to operate said servomotor.

8. In the tow vehicle-trailer system, as recited in claim 1, wherein movement of the second piston means toward said fifth chamber in response to a pressure differential between said fourth and fifth chambers causes a corresponding movement of said poppet means to permit unrestricted flow through the central bore into the fourth chamber.

9. In the tow vehicle-trailer system, as recited in claim 8 wherein said poppet means and said spring means act as a check valve during a decrease in the fluid pressure in the fifth chamber to permit fluid communication between the fourth and fifth chambers whenever the fluid pressure in the fourth chamber exceeds the fluid pressure in the fifth chamber by an amount sufficient to force the poppet means away from the second piston means against the bias of a second spring.

* * * * *